United States Patent
Takiguchi et al.

(10) Patent No.: US 8,332,116 B2
(45) Date of Patent: Dec. 11, 2012

(54) REACTION FORCE APPARATUS

(75) Inventors: Hirotaka Takiguchi, Utsunomiya (JP); Yoichi Sugimoto, Utsunomiya (JP); Go Suzaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 463 days.

(21) Appl. No.: 12/724,872

(22) Filed: Mar. 16, 2010

(65) Prior Publication Data

US 2010/0250084 A1 Sep. 30, 2010

(30) Foreign Application Priority Data

Mar. 31, 2009 (JP) ................................ 2009-088184

(51) Int. Cl.
*G06F 19/00* (2011.01)

(52) U.S. Cl. ............ 701/70; 701/301; 701/41; 701/93; 701/300; 477/120; 180/65.6; 180/65.265

(58) Field of Classification Search .............. 701/301, 701/70, 41, 93, 300, 29.2, 49; 123/399; 477/120; 180/65.6, 65.265
See application file for complete search history.

(56) References Cited

U.S. PATENT DOCUMENTS

| | | | | |
|---|---|---|---|---|
| 6,981,486 B2 * | 1/2006 | Yone et al. | ..................... | 123/399 |
| 7,022,045 B2 * | 4/2006 | Yone | .............................. | 477/120 |
| 7,162,349 B2 * | 1/2007 | Hijikata et al. | .................. | 701/70 |
| 7,222,009 B2 * | 5/2007 | Hijikata et al. | .................. | 701/41 |
| 7,826,970 B2 * | 11/2010 | Kobayashi et al. | ........... | 701/300 |
| 8,002,058 B2 * | 8/2011 | Ishikawa | .................. | 180/65.265 |
| 8,006,790 B2 * | 8/2011 | Kimura et al. | ............... | 180/65.6 |
| 8,019,521 B2 * | 9/2011 | Peterson | ......................... | 701/70 |
| 8,126,609 B2 * | 2/2012 | Kimura et al. | ............... | 701/29.2 |
| 8,145,389 B2 * | 3/2012 | Kobayashi et al. | .............. | 701/49 |
| 2003/0190996 A1 | 10/2003 | Yone | | |
| 2005/0090984 A1 * | 4/2005 | Kobayashi et al. | ........... | 701/301 |
| 2008/0140294 A1 * | 6/2008 | Park | ................................ | 701/93 |

FOREIGN PATENT DOCUMENTS

| | | |
|---|---|---|
| JP | 09-277850 A | 10/1997 |
| JP | 2003-260951 | 9/2003 |
| JP | 2004-060484 A | 2/2004 |
| JP | 2007-030551 A | 2/2007 |

* cited by examiner

*Primary Examiner* — Behrang Badii
*Assistant Examiner* — Robert Payne
(74) *Attorney, Agent, or Firm* — Carrier Blackman & Associates, P.C.; Joseph P. Carrier; William D. Blackman

(57) ABSTRACT

A reaction force apparatus incorporated in a vehicle includes a reaction force controller for setting an acceleration intention boundary threshold value, which comprises a threshold value with respect to a rate of depression of an accelerator pedal, and which determines whether the driver of the vehicle intends to accelerate the vehicle quickly or gradually. The reaction force controller reduces the reaction force when the rate of depression exceeds the acceleration intention boundary threshold value, whereas the reaction force controller maintains the reaction force when the rate of depression is less than the acceleration intention boundary threshold value.

6 Claims, 6 Drawing Sheets

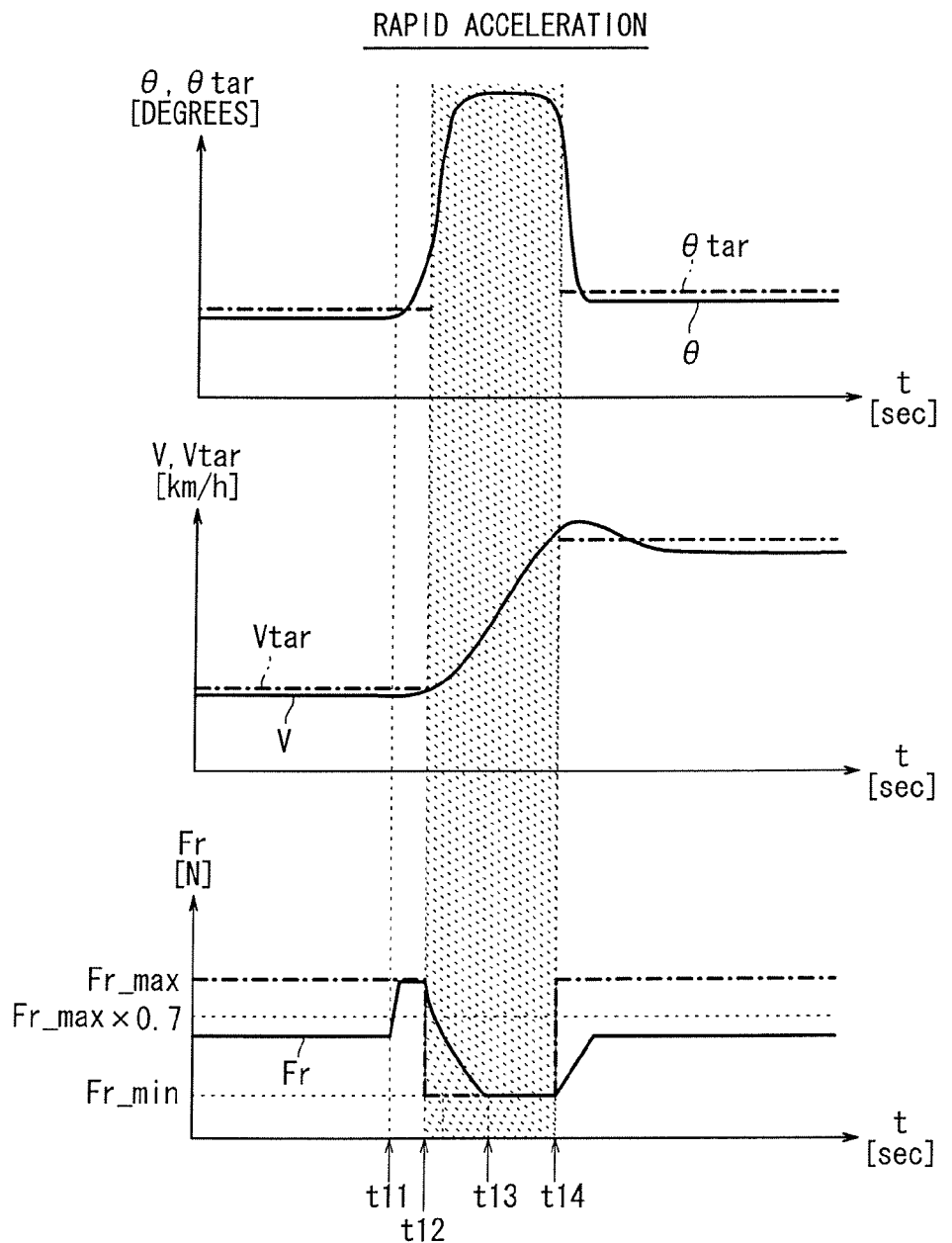

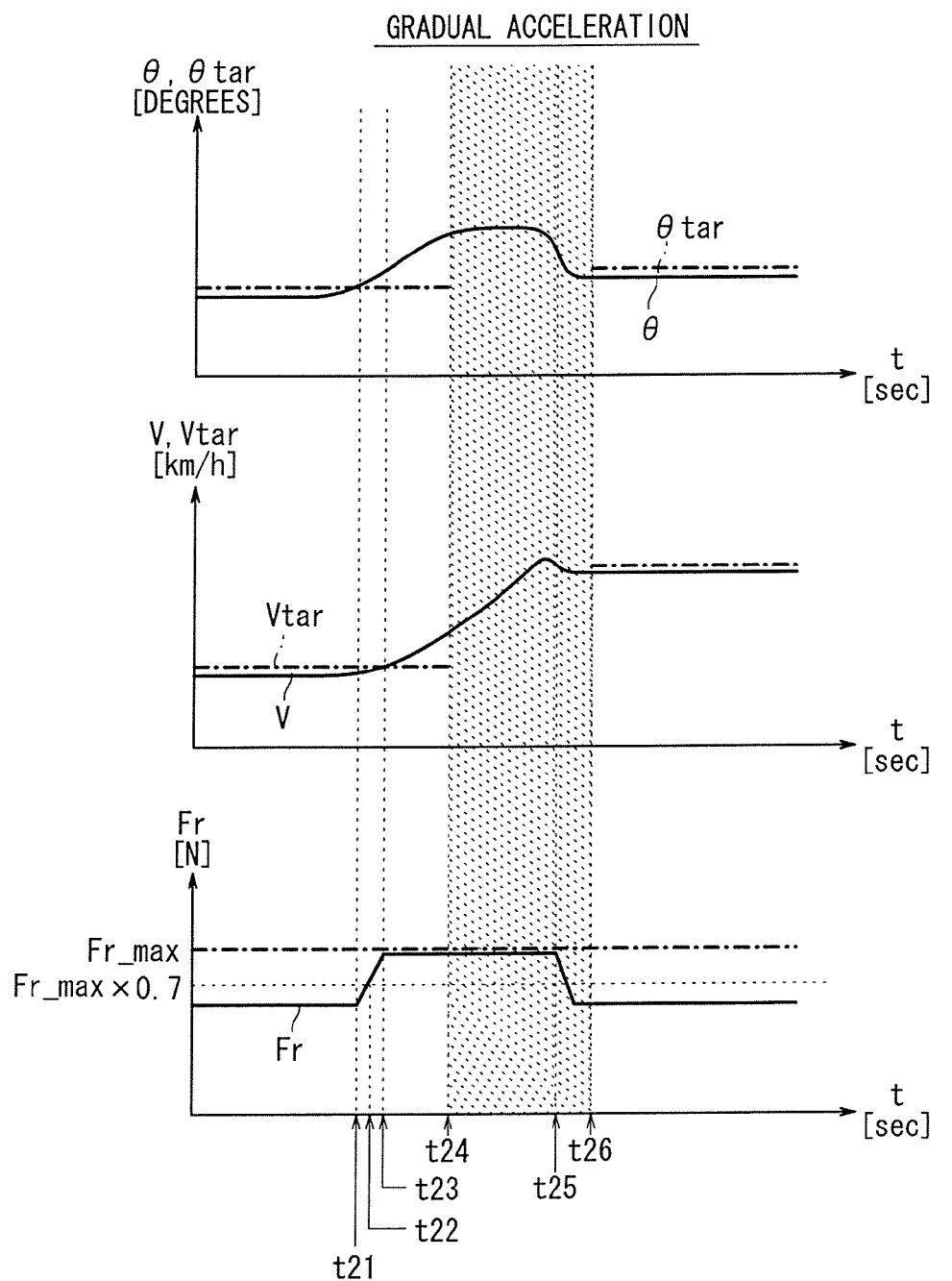

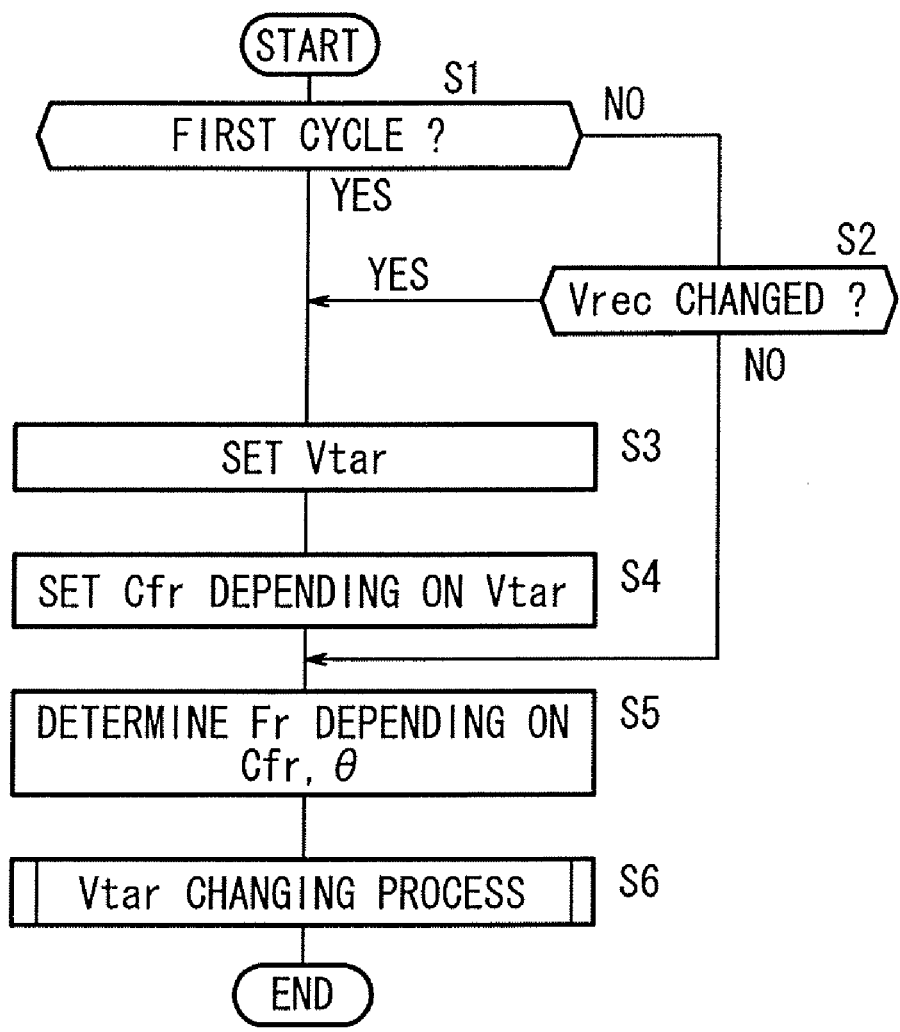

REACTION FORCE APPARATUS

CROSS-REFERENCE TO RELATED APPLICATION

This application is based upon and claims the benefit of priority from Patent Application No. 2009-088184 filed on Mar. 31, 2009, in the Japan Patent Office, of which the contents are incorporated herein by reference.

BACKGROUND OF THE INVENTION

1. Field of the Invention

The present invention relates to a reaction force apparatus for assisting a vehicle in traveling at a target vehicle speed by controlling a reaction force that is applied to the accelerator pedal of the vehicle.

2. Description of the Related Art

Technologies have been available in the art for applying an additional reaction force from a motor, in addition to the reaction force from a return spring, to the accelerator pedal of a vehicle (see Japanese Laid-Open Patent Publication No. 2003-260951 and U.S. Patent Application Publication No. 2003/0190996). According to Japanese Laid-Open Patent Publication No. 2003-260951, a threshold speed is calculated, and an additional reaction force is applied to the accelerator pedal when the speed of the vehicle reaches a threshold speed (see FIG. 2 and paragraph [0019] of the publication). Furthermore, according to Japanese Laid-Open Patent Publication No. 2003-260951, when the vehicle speed of the vehicle exceeds the threshold speed, a drive force of the rotating motor (2) is increased. A characteristic by which the drive force is applied (see FIG. 2 of the publication) is set depending on road conditions (see paragraphs [0019] through [0022] and FIGS. 3 through 5 of the publication).

According to U.S. Patent Application Publication No. 2003/0190996, a pedal reaction force (RP1), which acts on the accelerator pedal, is generated by an electric motor depending on a pedal depression amount (PS) (see FIG. 3 of the application). Furthermore, according to U.S. Patent Application Publication No. 2003/0190996, the reaction force is canceled when it is detected that the driver intends to accelerate the vehicle, for example, by depressing the accelerator pedal.

When the reaction force is reduced based on the driver's intention to accelerate the vehicle, since the accelerator pedal quickly becomes lighter as a result of being released from the reaction force, the driver possibly could depress the accelerator pedal more deeply than intended. According to Japanese Laid-Open Patent Publication No. 2003-260951 and U.S. Patent Application Publication No. 2003/0190996, therefore, the speed of the vehicle cannot be increased gradually.

SUMMARY OF THE INVENTION

It is an object of the present invention to provide a reaction force apparatus, which is capable of gradually increasing the vehicle speed of a vehicle that incorporates a reaction force apparatus therein.

A reaction force apparatus according to the present invention includes a reaction force applying unit for applying a reaction force to an accelerator pedal, an amount-of-depression determining unit for determining an amount of depression of the accelerator pedal, a reaction force controller for controlling the reaction force applied by the reaction force applying unit depending on the amount of depression, and a rate-of-depression determining unit for determining a rate of depression of the accelerator pedal, wherein the reaction force controller sets an acceleration intention boundary threshold value, which comprises a threshold value with respect to the rate of depression, for determining whether a driver intends to accelerate quickly or gradually, and wherein the reaction force controller reduces the reaction force when the rate of depression exceeds the acceleration intention boundary threshold value, and maintains the reaction force when the rate of depression is less than the acceleration intention boundary threshold value.

According to the present invention, if the driver of the vehicle intends to accelerate the vehicle quickly, then the reaction force applied to the accelerator pedal is reduced, whereas if the driver of the vehicle intends to accelerate the vehicle gradually, then the reaction force applied to the accelerator pedal is maintained. Therefore, when the driver intends to accelerate the vehicle gradually, the reaction force is not reduced, whereby the driver is prevented from depressing the accelerator pedal excessively, and the driver is capable of increasing the vehicle speed gradually.

The reaction force may further include a vehicle speed determining unit for determining a vehicle speed of a vehicle that incorporates the reaction force apparatus therein, wherein the reaction force controller sets a reaction force applying characteristic by which the reaction force is applied, depending on a target vehicle speed of the vehicle.

After the reaction force controller has reduced the reaction force when the rate of depression exceeds the acceleration intention boundary threshold value, the reaction force controller may set the vehicle speed of the vehicle as the target vehicle speed when the accelerator pedal is returned. Consequently, the new target vehicle speed can be newly set depending on the intention of the driver. After the accelerator pedal has returned following quick acceleration of the vehicle, the vehicle might be accelerated due to inertia or the like. However, since the vehicle speed at a time when the accelerator pedal is returned is set as the target vehicle speed, vehicle speeds not based on the intention of the driver are prevented from being set as the target vehicle speed. Furthermore, inasmuch as the target vehicle speed is renewed depending on the rate of depression, the target vehicle speed is prevented from being renewed while the vehicle is under acceleration for certain reasons not based on the intention of the driver, such as when the vehicle is running on a slope. Accordingly, the target vehicle speed is prevented from being renewed unnecessarily.

The reaction force controller may set a target vehicle speed change determining threshold value, which comprises a threshold value with respect to the reaction force or the amount of depression, for determining whether the target vehicle speed is to be changed or not, and a target vehicle speed change finalizing time for finalizing a decision to change the target vehicle speed, wherein the reaction force controller may permit the target vehicle speed to be updated when a time, during which the reaction force or the amount of depression exceeds the target vehicle speed change determining threshold value, exceeds the target vehicle speed change finalizing time. Relatively frequently, the driver wants to accelerate the vehicle gradually. However, if the target vehicle speed were changed every time the driver wanted to accelerate the vehicle gradually, then the reaction force applying characteristic would be changed too frequently, thus tending to make the driver feel uncomfortable. According to the above arrangement, the target vehicle speed is permitted to be renewed only when the reaction force has exceeded the target vehicle speed change determining threshold value for the target vehicle speed change finalizing time. Consequently, the reaction force applying characteristic is prevented from being changed too frequently, and thus prevents the driver from feeling uncomfortable.

The reaction force controller may set a gradual acceleration end determining threshold value, which comprises a threshold value with respect to the rate of depression, for determining that the vehicle has stopped being accelerated gradually, and a vehicle speed stabilizing period indicative of a period after the vehicle stops being accelerated gradually until the vehicle speed of the vehicle is stabilized, or a vehicle speed change threshold value, which comprises a threshold value with respect to a change per unit time of the vehicle speed, for indicating that the vehicle speed of the vehicle is stabilized. In this case, the reaction force sets the vehicle speed as the target vehicle speed upon occurrence of both a first condition, in which the rate of depression is less than the gradual acceleration end determining threshold value, and a second condition, in which the vehicle speed stabilizing period elapses or the change per unit time in the vehicle speed is less than the vehicle speed change threshold value.

Therefore, the target vehicle speed can newly be set depending on the intention of the driver. In other words, when the driver accelerates the vehicle gradually, the driver fine-tunes the vehicle speed. With the above arrangement, the vehicle speed at a time when the driver has finished fine-tuning of the vehicle speed is set as the target vehicle speed.

The reaction force may further include a reaction force adjuster, operable by the driver, for adjusting a rate of increase of the reaction force depending on the amount of depression. The reaction force adjuster can adjust a relative relationship between the amount of depression and the change in the reaction force, for thereby easily controlling the vehicle and enabling the vehicle to be accelerated both quickly and gradually according to settings made by the driver.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a diagram showing the relationship between the amount of depression of the accelerator pedal, the target amount of depression of the accelerator pedal, the vehicle speed of the vehicle, the target vehicle speed of the vehicle, and the additional reaction force applied to the accelerator pedal at a time when the vehicle is quickly accelerated;

FIG. 4 is a diagram showing the relationship between the amount of depression of the accelerator pedal, the target amount of depression of the accelerator pedal, the vehicle speed of the vehicle, the target vehicle speed of the vehicle, and the additional reaction force applied to the accelerator pedal at a time when the vehicle is gradually accelerated;

FIG. 5 is a flowchart of a processing sequence for applying and changing the additional reaction force according to the embodiment.

DESCRIPTION OF THE PREFERRED EMBODIMENTS

A. Embodiment

Figure 1:
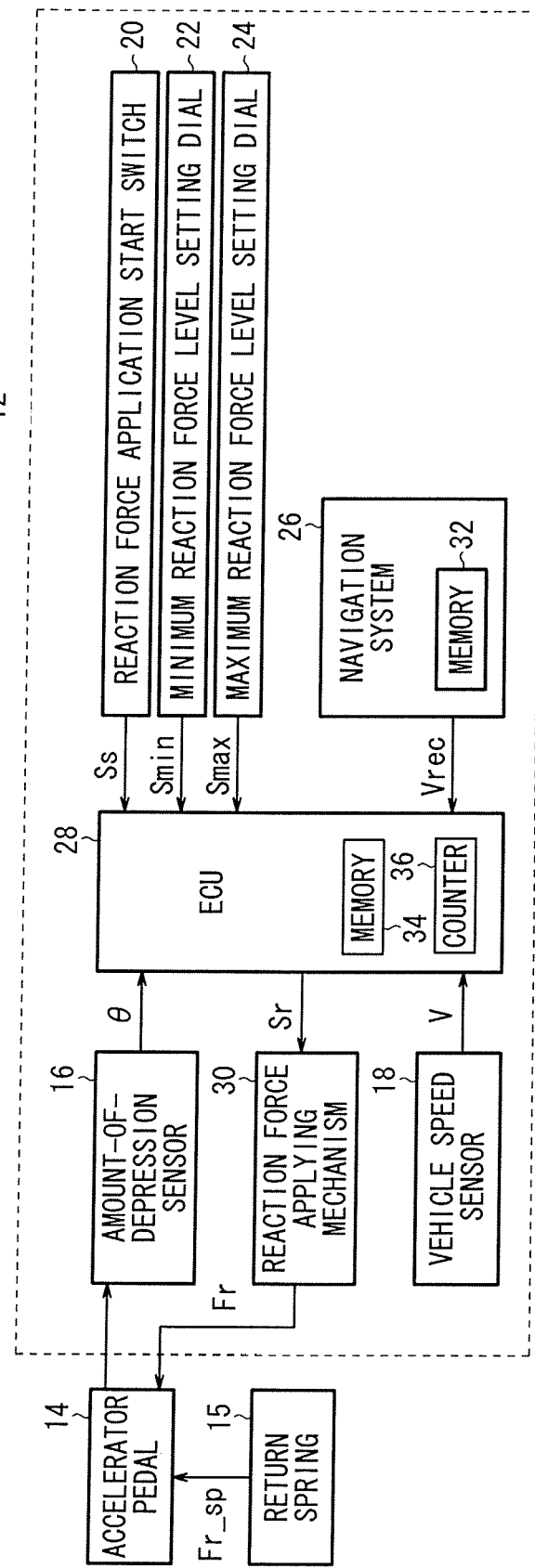
FIG. 1 is a block diagram of a vehicle which incorporates therein a reaction force apparatus according to an embodiment of the present invention.

A vehicle, which incorporates therein a reaction force apparatus according to an embodiment of the present invention, will be described below with reference to the drawings.
1. Arrangement of Vehicle 10:

FIG. 1 is a block diagram of a vehicle 10, which incorporates therein a reaction force apparatus 12 according to the present embodiment. The vehicle 10 comprises a four-wheeled motor vehicle, for example. The vehicle 10 includes, in addition to the reaction force apparatus 12, an accelerator pedal 14 for controlling an engine, not shown, and a return spring 15 for applying a reaction force Fr_sp [N] to the accelerator pedal 14.

The reaction force apparatus 12 comprises an amount-of-depression sensor 16, a vehicle speed sensor 18, a reaction force application start switch 20, a minimum reaction force level setting dial 22, a maximum reaction force level setting dial 24 (reaction force adjuster), a navigation system 26 (recommended vehicle speed determining unit), an ECU (Electronic Control Unit) 28 (reaction force controller, rate-of-depression determining unit), and a reaction force applying mechanism 30 (reaction force applying unit).

The amount-of-depression sensor 16 detects an amount $\theta$ [degrees] of depression of the accelerator pedal 14 from its original position, and outputs the detected amount $\theta$ of depression to the ECU 28. The vehicle speed sensor 18 measures a vehicle speed V [km/hour] of the vehicle 10, and outputs the measured vehicle speed V to the ECU 28.

The reaction force application start switch 20 (hereinafter also referred to as "switch 20") is turned on by the driver of the vehicle 10 in order to instruct the ECU 28 to start applying a reaction force Fr [N] to the accelerator pedal 14 from the reaction force applying mechanism 30. More specifically, when the driver turns on the switch 20, the switch 20 sends a reaction force application start signal Ss indicative of an initiation of application of the reaction force to the ECU 28. In response to the received reaction force application start signal Ss, the ECU 28 starts applying the reaction force Fr to the accelerator pedal 14.

The minimum reaction force level setting dial 22 (hereinafter also referred to as "dial 22") is turned by the driver in order to set a minimum level Fr_min [N] for the reaction force Fr generated by the reaction force applying mechanism 30. More specifically, when the driver turns the dial 22, the dial 22 sends a minimum level changing signal Smin indicative of a change in the minimum level Fr_min to the ECU 28. In response to the received minimum level changing signal Smin, the ECU 28 increases or decreases the minimum level Fr_min.

The maximum reaction force level setting dial 24 (hereinafter also referred to as "dial 24") is turned by the driver in order to set a maximum level Fr_max [N] for the reaction force Fr generated by the reaction force applying mechanism 30. More specifically, when the driver turns the dial 24, the dial 24 sends a maximum level changing signal Smax indicative of a change in the maximum level Fr_max to the ECU 28.

In response to the received maximum level changing signal Smax, the ECU 28 increases or decreases the maximum level Fr_max.

The driver can adjust the rate [N/degree] of increase of the reaction force Fr by turning either one of the dials 22, 24. Specifically, according to the present embodiment, a range of amounts θ of depression ("reaction force increasing range Rfr" to be described later) in which the reaction force Fr can increase is fixed. When one of the minimum level Fr_min and the maximum level Fr_max is changed by the dial 22 or 24, a change in the reaction force Fr, which depends on a change in the amount θ of depression, is adjusted.

The navigation system 26 is capable of detecting the position of the vehicle 10 using a GPS (Global Positioning System). The navigation system 26 includes a memory 32, which stores information concerning recommended vehicle speeds Vrec [km/hour] for various roads. The recommended vehicle speeds Vrec represent vehicle speeds that optimize mileage of the vehicle 10, depending on road conditions and also speed limits of the roads. Vehicle speeds for optimizing the mileage of the vehicle 10 can exist based on the fuel economy of the vehicle 10, gradients of the roads, types of roads (paved roads, graveled roads, etc.), or whether the roads have curves or not, etc. The navigation system 26 determines a recommended vehicle speed Vrec depending on the detected position of the vehicle 10, and sends the recommended vehicle speed Vrec to the ECU 28.

The ECU 28 sets a characteristic (reaction force applying characteristic Cfr) by which a reaction force Fr is applied to the accelerator pedal 14 depending on a target vehicle speed Vtar [km/hour], which is a target value for the vehicle speed V, and calculates a reaction force Fr [N] to be applied by the reaction force applying mechanism 30 to the accelerator pedal 14 based on the reaction force applying characteristic Cfr and the amount θ of depression. Then, the EPS 28 sends a control signal Sr representing the calculated reaction force Fr to the reaction force applying mechanism 30. The reaction force applying characteristic Cfr, which is stored in a memory 34 of the ECU 28, represents a relationship between the amount θ of depression and the reaction force Fr for each target vehicle speed Vtar. The ECU 28 also has a counter 36.

The reaction force applying mechanism 30 comprises an electric motor, not shown, connected to the accelerator pedal 14. The reaction force applying mechanism 30 applies the reaction force Fr to the accelerator pedal 14, wherein the reaction force Fr is represented by a control signal Sr received from the ECU 28. Therefore, both the reaction force Fr from the reaction force applying mechanism 30 and the reaction force Fr_sp from the return spring 15 are applied to the accelerator pedal 14. The reaction force applying mechanism 30 may alternatively comprise any of various drive force generating means, e.g., a pneumatic actuator.

Figure 2A:
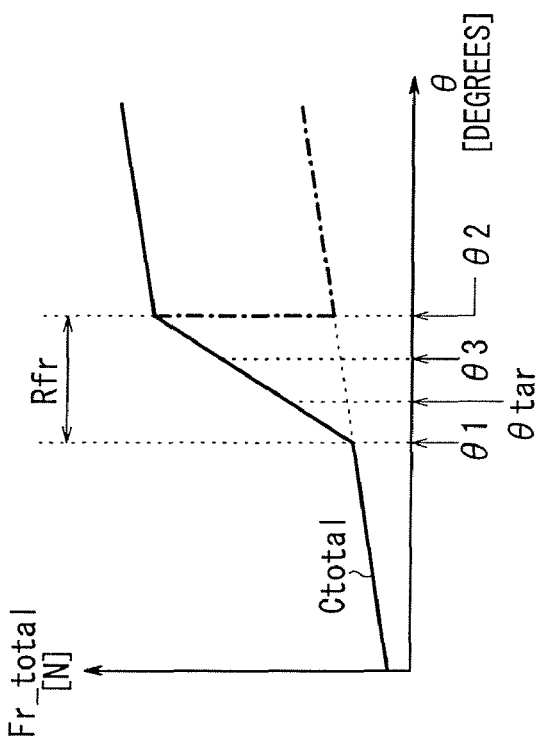
FIG. 2A is a diagram showing the relationship between the amount of depression of an accelerator pedal and the additional reaction force applied to the accelerator pedal by the reaction force apparatus.

2. Reaction Force Applying Characteristic:

As shown in FIG. 2A, according to the reaction force applying characteristic Cfr, which is used by the ECU 28, the reaction force Fr is kept constant at the minimum level Fr_min while the amount θ of depression of the accelerator pedal 14 increases up to a certain amount of depression (threshold value $\theta 1$). When the amount θ of depression increases from the threshold value $\theta 1$ up to a greater amount of depression (threshold value $\theta 2$), which represents the sum of the threshold value $\theta 1$ and a given value, the reaction force Fr increases. When the amount θ of depression reaches the threshold value $\theta 2$, the reaction force Fr reaches the maximum level Fr_max. When the amount θ of depression exceeds the threshold value $\theta 2$, the reaction force Fr either is kept constant at the maximum level Fr_max, as indicated by the solid-line curve in FIG. 2A, or is kept constant at the minimum level Fr_min, as indicated by the dot-and-dash-line curve in FIG. 2A (as shall be described in greater detail later). In the present embodiment, the reaction force Fr increases at a constant rate from the threshold value $\theta 1$ to the threshold value $\theta 2$. However, if necessary, the reaction force Fr may have a gradient that changes from the threshold value $\theta 1$ to the threshold value $\theta 2$.

The minimum level Fr_min may not be nil, but may be changed as desired by the dial 22. Similarly, the maximum level Fr_max may be changed as desired by the dial 24, while the maximum level Fr_max is indicative of the maximum level that can be generated by the reaction force applying mechanism 30.

A target amount θtar [degrees] of depression is set between the threshold value $\theta 1$ and the threshold value $\theta 2$. The target amount θtar of depression is an amount of depression that represents an accelerator pedal position at which the driver is expected to stably maintain the accelerator pedal 14. The target amount θtar of depression is set to an amount θ of depression that represents an accelerator pedal position at which the driver becomes aware of the reaction force Fr generated by the reaction force applying mechanism 30, whereupon the driver is expected to stop depressing the accelerator pedal 14 further. The target amount θtar of depression is set depending on the target vehicle speed Vtar, for example. The target amount θtar of depression may be set such that the vehicle speed V is equal to the target vehicle speed Vtar when the amount θ of depression of the accelerator pedal 14 is equal to the target amount θtar of depression. The reaction force Fr at this time is set to a value which is 30% of the maximum level Fr_max (Fr_max×0.3), for example. The reaction force Fr at the target amount θtar of depression may be set to a sum of the minimum level Fr_min and a predetermined value, or may be set to a difference between the maximum level Fr_max and a predetermined value.

In the present embodiment, an amount θ of depression at which the reaction force Fr is equal to 70% of the maximum level Fr_max (Fr_max×0.7) is used as a threshold value with respect to the amount θ of depression, in order to determine whether or not the target vehicle speed Vtar should be changed {target vehicle speed change determining threshold value $\theta 3$ (hereinafter referred to as "threshold value $\theta 3$")}. Details concerning usage of the threshold value $\theta 3$ will be described later.

In the present embodiment, a range from the threshold value $\theta 1$ to the threshold value $\theta 2$, in which the reaction force Fr increases {reaction force increasing range Rfr (hereinafter also referred to as "range Rfr")}, changes depending on the target vehicle speed Vtar. More specifically, as the target vehicle speed Vtar increases, the range Rfr is shifted to the right in FIG. 2A, whereas, as the target vehicle speed Vtar decreases, the range Rfr is shifted to the left in FIG. 2A.

Figure 2B:
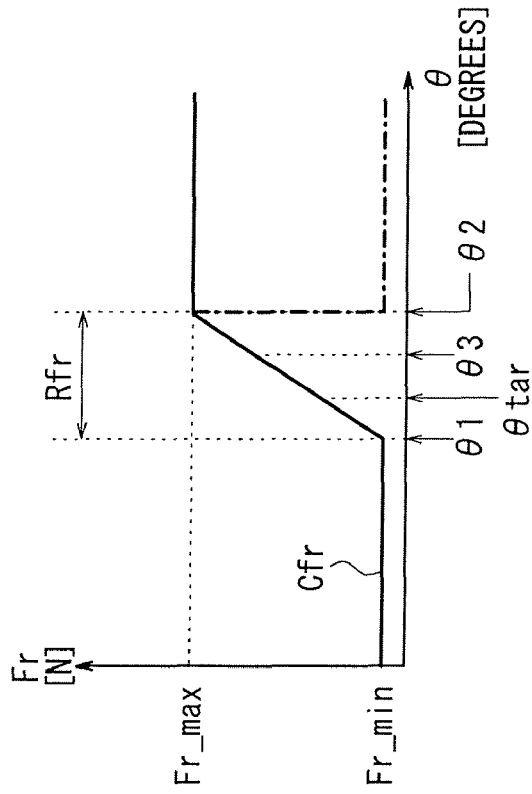
FIG. 2B is a diagram showing the relationship between the amount of depression of the accelerator pedal and the sum of the reaction force applied to the accelerator pedal by a return spring and the additional reaction force applied to the accelerator pedal by the reaction force apparatus.

FIG. 2B shows a characteristic (total reaction force characteristic Ctotal), which represents a total sum (total reaction force Fr_total) [N] of the reaction force Fr_sp generated by the return spring 15 plus the reaction force Fr generated by the reaction force applying mechanism 30. As shown in FIG. 2B, when the amount θ of depression is less than the threshold value $\theta 1$, the total reaction force Fr_total is equal to the total sum of the reaction force Fr_sp generated by the return spring 15 plus the minimum level Fr_min of the reaction force Fr generated by the reaction force applying mechanism 30. When the amount θ of depression resides within the reaction force increasing range Rfr, since the increase in the reaction force Fr is added to the increase in the reaction force Fr_sp, the total reaction force Fr_total increases greatly. When the amount θ of depression exceeds the threshold value θ2, the total reaction force Fr_total either is equal to the total sum of the reaction force Fr_sp generated by the return spring 15 plus the maximum level Fr_max, as indicated by the solid-line curve in FIG. 2B, or decreases as the reaction force Fr decreases, as indicated by the dot-and-dash-line curve in FIG. 2B.

3. Reaction Force During Acceleration:

According to the present embodiment, the reaction force Fr is applied according to different processes when the vehicle 10 is quickly accelerated and when the vehicle 10 is gradually accelerated. FIG. 3 shows by way of example the relationship between the amount θ of depression, the target θtar amount of depression, the vehicle speed V, the target vehicle speed Vtar, and the reaction force Fr, at a time when the vehicle 10 is quickly accelerated. FIG. 4 shows by way of example the relationship between the amount θ of depression, the target θtar amount of depression, the vehicle speed V, the target vehicle speed Vtar, and the reaction force Fr, at a time when the vehicle 10 is gradually accelerated. Quick and gradual accelerations are distinguished from each other depending on a rate of change per unit time in the amount θ of depression (rate Vθ of depression) [degrees/second] (to be described later).

The ECU 28 operates as follows when the vehicle 10 is accelerated quickly. As shown in FIG. 3, at time t11, when the driver begins to depress the accelerator pedal 14 strongly, thus causing the amount θ of depression to start to increase quickly, the reaction force Fr also starts to increase quickly. The vehicle speed V then starts to increase, with a slight delay, following the increase in the amount θ of depression.

When the ECU 28 detects rapid acceleration of the vehicle 10 at time t12, the ECU 28 stops using the target amount θtar of depression and the target vehicle speed Vtar, and temporarily reduces the maximum level Fr_max of the reaction force Fr to a new level, which is equal to the minimum level Fr_min or a level other than the minimum level Fr_min. As a result of reducing the maximum level Fr_max, the reaction force Fr generated by the reaction force applying mechanism 30 is gradually lowered until reaching the new maximum level Fr_max at time t13. When the reaction force Fr is lowered upon rapid acceleration of the vehicle 10, the reaction force Fr may be adjusted depending on the rate Vθ of depression.

When the driver eases depression of the accelerator pedal 14, thereby causing the amount θ of depression to begin decreasing at time t14, the ECU 28 sets a new target amount θtar of depression, and restores the maximum level Fr_max of the reaction force Fr back to its original level. As a result, the reaction force Fr increases gradually.

The ECU 28 operates as follows when the vehicle 10 is gradually accelerated. As shown in FIG. 4, when the driver starts to depress the accelerator pedal 14 gradually at time t21, thus causing the amount θ of depression to start increasing, the reaction force Fr also starts to increase. The vehicle speed V then starts to increase, with a slight delay, following the increase in the amount θ of depression.

When the reaction force Fr exceeds 70% of the maximum level Fr_max (Fr_max×0.7) at time t22, the ECU 28 measures a time during which the reaction force Fr exceeds 70% of the maximum level Fr_max, using a count CNT of the counter 36. When the driver further depresses the accelerator pedal 14, the reaction force Fr reaches the maximum level Fr_max at time t23.

At time t24, after a predetermined time, e.g., 4 seconds, has elapsed from time t22, the ECU 28 judges that the driver intends to accelerate the vehicle 10 gradually. The predetermined time is set as a time for finalizing a decision to change the target vehicle speed Vtar {target vehicle speed change finalizing time THcnt (hereinafter also referred to as "time THcnt")}. At time t24, the ECU 28 stops using the target amount θtar of depression and the target vehicle speed Vtar, and maintains the maximum level Fr_max of the reaction force Fr as it is. As a result, the reaction force Fr (=the maximum level Fr_max>the minimum level Fr_min), which remains unchanged, is continuously applied to the accelerator pedal 14.

When the driver eases depression of the accelerator pedal 14, thereby causing the amount θ of depression to start to decrease at time t25, the ECU 28 reduces the reaction force Fr depending on the amount θ of depression. When the vehicle speed V becomes constant at time t26, the ECU 28 sets a target vehicle speed Vtar depending on the vehicle speed V at time t26 and the target amount θtar of depression, which depends on the target vehicle speed Vtar.

FIG. 5 is a flowchart of a processing sequence for applying and changing the reaction force Fr, including the processes shown in FIGS. 3 and 4. In step S1 in FIG. 5, the ECU 28 determines, using a flag (not shown), whether or not the processing sequence is in a first cycle. If the processing sequence is in the first cycle (S1: YES), then control proceeds to step S3. If the processing sequence is in a second cycle or a subsequent cycle (S1: NO), then the ECU 28 determines whether or not the recommended vehicle speed Vrec from the navigation system 26 has been changed in step S2. If the recommended vehicle speed Vrec is changed (S2: YES), then control proceeds to step S3. If the recommended vehicle speed Vrec has not been changed (S2: NO), then control proceeds to step S5.

In step S3, the ECU 28 sets a target vehicle speed Vtar. If the target vehicle speed Vtar is set for the first time (S1: YES), then the ECU 28 sets the recommended vehicle speed Vrec from the navigation system 26 as the target vehicle speed Vtar. If the recommended vehicle speed Vrec has been changed (S2: YES), then the ECU 28 sets the changed recommended vehicle speed Vrec as the target vehicle speed Vtar.

In step S4, the ECU 28 sets a reaction force applying characteristic Cfr (see FIG. 2A), which depends on the target vehicle speed Vtar set in step S3. As a result, a target amount θtar of depression also is set. In step S5, the ECU 28 determines a reaction force Fr, which depends on the reaction force applying characteristic Cfr set in step S4 and an amount θ of depression detected by the amount-of-depression sensor 16. The ECU 28 outputs a control signal Sr based on the determined reaction force Fr to the reaction force applying mechanism 30. In response to the received control signal Sr, the reaction force applying mechanism 30 generates a reaction force Fr based on the control signal Sr.

In step S6, the ECU 28 carries out a target vehicle speed Vtar changing process (hereinafter also referred to as "Vtar changing process"). The Vtar changing process is a process for determining whether or not it is necessary to change the target vehicle speed Vtar and, if it is judged that it is necessary to change the target vehicle speed Vtar, setting a new target vehicle speed Vtar depending on whether the vehicle 10 is being quickly or gradually accelerated.

Figure 6:
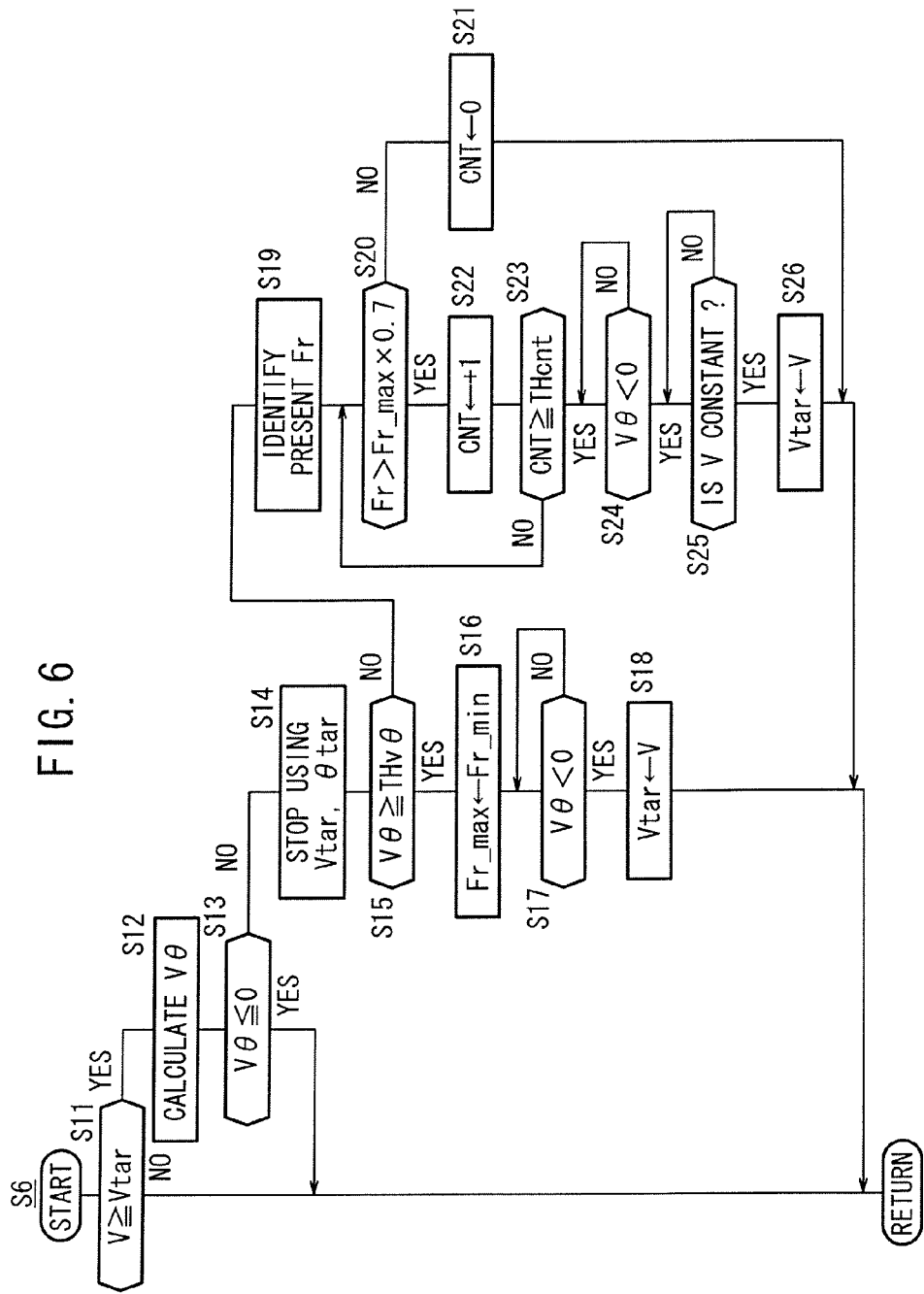
FIG. 6 is a flowchart of a target vehicle speed changing process (step S6) of the processing sequence shown in FIG. 5.

FIG. 6 is a flowchart showing details of the Vtar changing process. In step S11 shown in FIG. 6, the ECU 28 determines whether or not the vehicle speed V is equal to or greater than the target vehicle speed Vtar. If the vehicle speed V is less than the target vehicle speed Vtar (S11: NO), then since the vehicle speed V has not yet reached the target vehicle speed Vtar, it is considered that there is no need to change the target vehicle speed Vtar. The Vtar changing process is then ended. If the vehicle speed V is equal to or greater than the target vehicle speed Vtar (S11: YES), then in step S12, the ECU 28 calculates a rate $V\theta$ of depression [degrees/second] of the accelerator pedal 14, based on the amount $\theta$ of depression from the amount-of-depression sensor 16.

In step S13, the ECU 28 determines whether or not the rate $V\theta$ of depression is equal to or less than zero. If the rate $V\theta$ of depression is equal to or less than zero (S13: YES), then it is considered that the driver does not intend to accelerate the vehicle 10. Therefore, the Vtar changing process is ended. If the rate $V\theta$ of depression is greater than zero (S13: NO), then the driver possibly intends to accelerate the vehicle 10, and control proceeds to step S14. In step S14, the ECU 28 temporarily eliminates (i.e., stops using) the settings for the target vehicle speed Vtar and the target amount $\theta$tar of depression.

In step S15, the ECU 28 determines whether or not the rate $V\theta$ of depression is equal to or greater than a predetermined threshold value {acceleration intention boundary threshold value TH$v\theta$ (hereinafter also referred to as "threshold value TH$v\theta$")}. The threshold value TH$v\theta$ is a threshold value with respect to the rate $V\theta$ of depression for determining whether the driver intends to accelerate the vehicle 10 quickly or gradually. The threshold value TH$v\theta$ is stored in the memory 34. The ECU 28 may employ a plurality of threshold values TH$v\theta$ in association with a parameter such as the target vehicle speed Vtar or the like.

If the rate $V\theta$ of depression is equal to or greater than the threshold value TH$v\theta$ (S15: YES), then it is judged that the driver intends to accelerate the vehicle 10 quickly, and control proceeds to step S16. In step S16, the ECU 28 equalizes the maximum level Fr_max of the reaction force Fr with the minimum level Fr_min. In other words, the ECU 28 temporarily reduces the maximum level Fr_max set by the dial 24 to the minimum level Fr_min, thereby assisting in reducing the amount $\theta$ of depression.

In step S17, the ECU 28 determines whether or not the rate $V\theta$ of depression is less than zero. If the rate $V\theta$ of depression is equal to or greater than zero (S17: NO), then since the driver is continuously accelerating the vehicle 10, step S17 is repeated. If the rate $V\theta$ of depression is less than zero (S17: YES), then it is considered that the driver has stopped accelerating the vehicle 10, and control proceeds to step S18. In step S18, the ECU 28 sets the vehicle speed V at that time as a new target vehicle speed Vtar, at which point the Vtar changing process is ended.

If the rate $V\theta$ of depression is less than the acceleration intention boundary threshold value TH$v\theta$ (S15: NO), then it is judged that the driver intends to accelerate the vehicle 10 gradually, and control proceeds to step S19. In step S19, the ECU 28 identifies the present reaction force Fr, which is currently being generated by the reaction force applying mechanism 30. More specifically, the ECU 28 identifies the reaction force Fr calculated for generation of the control signal Sr. Alternatively, the ECU 28 can identify the reaction force Fr based on an output, such as the consumed electric current of the reaction force applying mechanism 30.

In step S20, the ECU 28 determines whether or not the reaction force Fr identified in step S19 exceeds 70% of the maximum level Fr_max (Fr_max×0.7). If the reaction force Fr identified in step S19 is equal to or less than 70% of the maximum level Fr_max (S20: NO), then the ECU 28 resets the counter 36 in order to clear the count CNT, and sets the target vehicle speed Vtar and the target amount $\theta$tar of depression, which have been suspended from use in step S14, for reuse in step S21. Then, the Vtar changing process is ended.

If the identified reaction force Fr exceeds 70% of the maximum level Fr_max (Fr_max×0.7) (S20: YES), then it is presumed that the driver possibly wants to accelerate the vehicle 10, i.e., increase the vehicle speed V, and control proceeds to step S22. In step S22, the ECU 28 increments the count CNT of the counter 36 by 1. Then, in step S23, the ECU 28 determines whether or not the count CNT is equal to or greater than a predetermined threshold value (the target vehicle speed change finalizing time THcnt).

If the count CNT is less than the time THcnt (S23: NO), then control goes back to step S20. If the count CNT is equal to or greater than the time THcnt (S23: YES), then the decision to change the target vehicle speed Vtar is finalized. Thereafter, steps S24 through S26 are carried out in order to set a new target vehicle speed Vtar.

In step S24, the ECU 28 determines whether or not the rate $V\theta$ of depression of the accelerator pedal 14 is less than zero. If the rate $V\theta$ of depression of the accelerator pedal 14 is equal to or greater than zero (S24: NO), then it is considered that the driver intends to accelerate the vehicle 10 further. Therefore, step S24 is repeated. If the rate $V\theta$ of depression of the accelerator pedal 14 is less than zero (S24: YES), then in step S25, the ECU 28 determines whether the vehicle speed V is constant or not, i.e., whether a rate of change $\Delta V$ [km/hour/second] in the vehicle speed, which is calculated from the vehicle speed V, is zero or not. If the vehicle speed V is not constant (S25: NO), it is considered that the driver is still in the process of adjusting the vehicle speed V. Therefore, step S25 is repeated. If the vehicle speed V is constant (S25: YES), then it is considered that the driver wants to drive the vehicle 10 at the vehicle speed V. In step S26, the ECU 28 sets the vehicle speed V at that time as a new target vehicle speed Vtar, at which point the Vtar changing process is ended.

4. Advantages of the Present Embodiment:

According to the present embodiment, if the rate $V\theta$ of depression is equal to or greater than the acceleration intention boundary threshold value TH$v\theta$ (S15: YES), then it is judged that the driver intends to accelerate the vehicle 10 quickly, and the reaction force Fr is reduced in step S16. If the rate $V\theta$ of depression is less than the acceleration intention boundary threshold value TH$v\theta$ (S15: NO), then it is judged that the driver intends to accelerate the vehicle 10 gradually, and the reaction force Fr is maintained. Therefore, when the driver wants to accelerate the vehicle 10 gradually, the reaction force Fr is not reduced. Accordingly, the driver can gradually increase the vehicle speed V, but the driver is prevented from excessively depressing the accelerator pedal 14.

According to the present embodiment, after the reaction force Fr is reduced as a result of the rate $V\theta$ of depression being greater than the acceleration intention boundary threshold value TH$v\theta$ (S15: YES→S16), the vehicle speed V is set as a target vehicle speed Vtar in step S18 at a time when the accelerator pedal 14 is restored to its original position (S17: YES). Consequently, the target vehicle speed Vtar can be newly set depending on the intention of the driver. After the accelerator pedal 14 is returned following quick acceleration of the vehicle 10, the vehicle 10 could still be accelerated due to inertia or the like. However, since the vehicle speed V at the time the accelerator pedal 14 is returned is set as the target vehicle speed Vtar, any vehicle speed V that is not actually based on the intention of the driver is prevented from being set as the target vehicle speed V. Furthermore, inasmuch as the target vehicle speed V is renewed depending on the rate $V\theta$ of depression, the target vehicle speed V is prevented from being renewed when the vehicle 10 is accelerated for some other reason not based on the intention of the driver, such as when the vehicle is running on a slope. Accordingly, the target vehicle speed V is prevented from being renewed unnecessarily.

According to the present embodiment, 70% of the maximum level Fr_max (Fr_max×0.7) is set as a threshold value for determining whether or not the target vehicle speed Vtar should be changed. Further, the target vehicle speed change finalizing time THcnt is set for finalizing a decision to change the target vehicle speed Vtar. When a time, during which the reaction force Fr exceeds 70% of the maximum level Fr_max, exceeds the time THcnt (S23: YES), the target vehicle speed V is permitted to be renewed. Relatively frequently, the driver will want to accelerate the vehicle 10 gradually. However, if the target vehicle speed Vtar were changed each time the driver wanted to accelerate the vehicle 10 gradually, then the reaction force applying characteristic Cfr would be changed too frequently, and thus tend to make the driver feel uncomfortable. Therefore, according to the present embodiment, the target vehicle speed V is allowed to be renewed only when the reaction force Fr has exceeded 70% of the maximum level Fr_max continuously for a time that exceeds the time THcnt. Consequently, the reaction force applying characteristic Cfr is prevented from being changed too frequently, and thus the driver is prevented from being made to feel uncomfortable.

According to the present embodiment, the vehicle speed V, at a time when the rate Vθ of depression is less than zero (S24: YES) and while the vehicle speed V is constant (S25: YES), is set as the target vehicle speed Vtar (S26). Therefore, the target vehicle speed Vtar is newly set depending on the intention of the driver. In other words, when the driver accelerates the vehicle 10 gradually, it is assumed that the driver is fine-tuning the vehicle speed V. When the driver has finished fine-tuning the vehicle speed V, the vehicle speed V is set as the target vehicle speed Vtar.

According to the present embodiment, the driver can adjust the rate at which the reaction force Fr increases by turning the minimum reaction force level setting dial 22, or by turning the maximum reaction force level setting dial 24. Thus, a relative relationship between the amount θ of depression and the change in the reaction force Fr can be adjusted, for thereby easily controlling the vehicle 10 so as to be accelerated quickly and gradually according to settings made by the driver. If a target value for the amount θ of depression at which the driver wants to hold the accelerator pedal 14 is represented by a predetermined percentage (e.g., 30%) of the maximum level Fr_max of the reaction force Fr, then since the accelerator pedal 14 starts to be depressed at different points even at the same rate Vθ of depression, the depressing force applied to reduce the reaction force Fr when the vehicle 10 is accelerated can be set according to the driver.

B. Modifications

The present invention is not limited to the illustrated embodiment. Various changes and modifications may be made to the invention, based on the above disclosure of the present application. Examples of such changes and modifications will be described below.

In the illustrated embodiment, the target amount θtar of depression is set depending on the target vehicle speed Vtar. However, the reaction force Fr can be controlled based only on the target amount θtar of depression.

In the illustrated embodiment, the recommended vehicle speed Vrec is acquired from the navigation system 26. However, the recommended vehicle speed Vrec may be acquired via wireless communications from an external source outside of the vehicle 10. Alternatively, the ECU 28 may calculate the recommended vehicle speed Vrec.

In the illustrated embodiment, 70% of the maximum level Fr_max is used as a threshold value for determining whether or not the target vehicle speed Vtar should be changed. However, any of various other values relative to the reaction force Fr, e.g., 50% to 100% of the maximum level Fr_max, may be used as such a threshold value. Alternatively, an amount θ of depression, which corresponds to 70% of the maximum level Fr_max, rather than the value relative to the reaction force Fr, may be used as a threshold value for determining whether or not the target vehicle speed Vtar should be changed.

In the illustrated embodiment, the fact that the rate Vθ of depression is less than zero (S24: YES) is used as a condition for setting the target vehicle speed Vtar when the vehicle 10 is accelerated gradually. However, any other value, which serves to establish the fact that the rate Vθ of depression is equal to or less than such a value, may be used as such a condition.

In the illustrated embodiment, the fact that the vehicle speed V is constant is used as a condition for setting a target vehicle speed Vtar when the vehicle 10 is accelerated gradually. However, a vehicle speed V, which occurs upon elapse of a certain period after the count CNT has become equal to or greater than the time THcnt, may be used as a target vehicle speed Vtar. In this case, the certain period may be an empirically established time period, for example, at which the vehicle speed V (vehicle speed stabilizing period) becomes stabilized after the vehicle 10 has been accelerated gradually.

In the illustrated embodiment, the minimum level Fr_min and the maximum level Fr_max of the reaction force Fr can be changed using the dials 22, 24. However, apart from such dials 22, 24, the minimum level Fr_min and the maximum level Fr_max may be changed by another means, such as buttons or panel operations, for example. Further, alternatively, the minimum level Fr_min and the maximum level Fr_max may be fixed values.

Although certain preferred embodiments of the present invention have been shown and described in detail, it should be understood that various changes and modifications may be made to the embodiments without departing from the scope of the invention as set forth in the appended claims.

What is claimed is:

1. A reaction force apparatus comprising:
a reaction force applying unit for applying a reaction force to an accelerator pedal;
an amount-of-depression determining unit for determining an amount of depression of the accelerator pedal;
a reaction force controller for controlling the reaction force applied by the reaction force applying unit depending on the amount of depression; and
a rate-of-depression determining unit for determining a rate of depression of the accelerator pedal,
wherein the reaction force controller sets an acceleration intention boundary threshold value, which comprises a threshold value with respect to the rate of depression, for determining whether a driver intends to accelerate quickly or gradually, and
wherein the reaction force controller reduces the reaction force when the rate of depression exceeds the acceleration intention boundary threshold value, and maintains the reaction force when the rate of depression is less than the acceleration intention boundary threshold value.

2. A reaction force apparatus according to claim 1, further comprising:

a vehicle speed determining unit for determining a vehicle speed of a vehicle that incorporates the reaction force apparatus therein, wherein the reaction force controller sets a reaction force applying characteristic by which the reaction force is applied, depending on a target vehicle speed of the vehicle.

3. A reaction force apparatus according to claim 2, wherein, after the reaction force controller has reduced the reaction force when the rate of depression exceeds the acceleration intention boundary threshold value, the reaction force controller sets the vehicle speed of the vehicle as the target vehicle speed when the accelerator pedal is returned.

4. A reaction force apparatus according to claim 2, wherein the reaction force controller sets a target vehicle speed change determining threshold value, which comprises a threshold value with respect to the reaction force or the amount of depression, for determining whether the target vehicle speed is to be changed or not, and a target vehicle speed change finalizing time for finalizing a decision to change the target vehicle speed, and wherein the reaction force controller permits the target vehicle speed to be updated when a time, during which the reaction force or the amount of depression exceeds the target vehicle speed change determining threshold value, exceeds the target vehicle speed change finalizing time.

5. A reaction force apparatus according to claim 2, wherein the reaction force controller sets a gradual acceleration end determining threshold value, which comprises a threshold value with respect to the rate of depression, for determining that the vehicle has stopped being accelerated gradually, and a vehicle speed stabilizing period indicative of a period after the vehicle stops being accelerated gradually until the vehicle speed of the vehicle is stabilized, or a vehicle speed change threshold value, which comprises a threshold value with respect to a change per unit time of the vehicle speed, for indicating that the vehicle speed of the vehicle is stabilized, and wherein the reaction force controller sets the vehicle speed as the target vehicle speed upon occurrence of both a first condition, in which the rate of depression is less than the gradual acceleration end determining threshold value, and a second condition, in which the vehicle speed stabilizing period elapses or the change per unit time in the vehicle speed is less than the vehicle speed change threshold value.

6. A reaction force apparatus according to claim 1, further comprising:

a reaction force adjuster, operable by the driver, for adjusting a rate of increase of the reaction force depending on the amount of depression.

* * * * *